June 30, 1931.  F. WELS  1,812,252

DIRIGIBLE SLEDGE OR SLEIGH

Filed Dec. 3, 1929

F. Wels
INVENTOR

Patented June 30, 1931

1,812,252

UNITED STATES PATENT OFFICE

FRANZ WELS, OF SCHLOSS HARTA, NEAR HOHENELBE, CZECHOSLOVAKIA, ASSIGNOR OF ONE-HALF TO CHRISTIAN KRONIG, OF SCHLOSS HARTA, NEAR HOHENELBE, CZECHOSLOVAKIA

DIRIGIBLE SLEDGE OR SLEIGH

Application filed December 3, 1929, Serial No. 411,358, and in Austria November 29, 1928.

Dirigible sledges, sleighs, boats and the like are already known in which rotatable vanes, runners and the like are provided for the steering.

The present invention is based on a principle which fundamentally differs from the above principle, namely on the principle of steering the vehicle by means of a paddle-wheel with vanes at the forward end or stem or at the rear end or stern of the vehicle, such as a sledge, sleigh, boat or the like, the said paddle-wheel being rotated substantially about the longitudinal axis of the vehicle. Thus the vehicle is pushed laterally out of its course by way of the resistance raised on the track by rotating the paddle-wheel and transmitted to the vehicle as a transversal force. Therefore the travelling vehicle is not obstructed in the direction of travel and is not subjected to a resistance at the forward end as in the case of the known arrangements.

Some modes of carrying out the present invention are illustrated by way of example on the accompanying sheet of drawings in which:—

A shaft S is rotatably mounted at the front of the vehicle substantially at the longitudinal axis thereof and carries a steering wheel V and a paddle wheel constituted by vanes A. Preferably four vanes A are provided and are pivotally secured to the shaft S. Sledges fitted with the steering device according to the present invention can be provided with two, three, four and even eight seats and with a brake of known construction.

Figure 1:
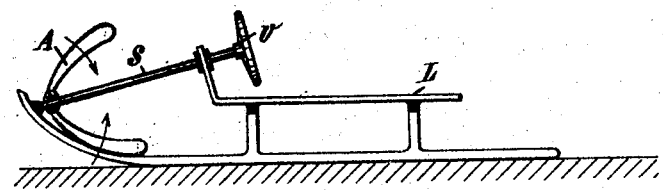
Figs. 1, 2 and 3 show a dirigible sledge in sectional side view, plan view and front view respectively.
Figure 2:
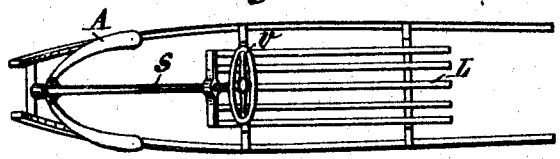

Fig. 2 shows, that the radius of the steering circle does not pass beyond the gauge of the runners of the sledge.

Figure 3:
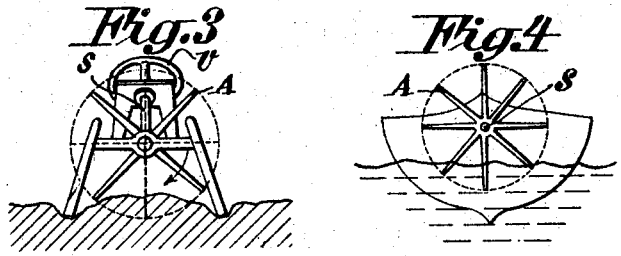

Fig. 3 shows the sledge on snow, the dotted lines indicating adjusted positions of the vanes.

Figure 4:
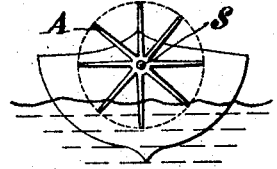
Fig. 4 is a front view of a boat provided with the steering device according to the present invention.

The paddle-wheel acting as ship's rudder illustrated in Fig. 4 is provided with eight vanes. Rudders of this kind may be arranged at the forward end and rear end and may be operated individually or jointly by a bevel wheel gear or the like.

Figure 5:
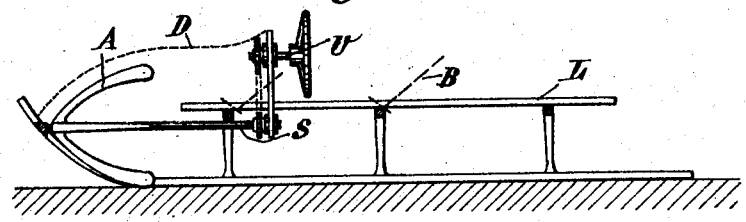
Fig. 5 shows in sectional side view a modified construction of the dirigible sledge.

In the construction shown in Fig. 5, the shaft of the paddle-wheel and shaft of the steering wheel are disposed horizontally and connected by a chain wheel drive of any desired ratio. The legs of the passengers rest on foot-boards B. The dotted line D indicates a casing. The extraordinary effect of this steering arrangement in water or on snow or ice consists in that every vane of the travelling vehicle meets with a good resistance on the undisturbed track.

I claim:—

1. In a dirigible sledge, sleigh, boat and the like the provision of a paddle-wheel with vanes rotatably attached to the vehicle substantially about its longitudinal axis, steering means for rotating said paddle-wheel and means transmitting the rotation of said steering means to the shaft of said paddle-wheel.

2. In a dirigible sledge, sleigh, boat and the like the provision of a paddle-wheel rotatably attached to the vehicle substantially about its longitudinal axis, the paddle-wheel comprising a shaft, vanes pivotally secured thereto, steering means for rotating said paddle-wheel, and means transmitting the rotation of said steering means to said shaft.

In testimony whereof I affix my signature.

FRANZ WELS.